United States Patent
Sahara

(10) Patent No.: US 8,306,135 B2
(45) Date of Patent: Nov. 6, 2012

(54) COMMUNICATION SYSTEM, BASE STATION, TERMINAL, AND COMMUNICATION METHOD

(75) Inventor: Toru Sahara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 601 days.

(21) Appl. No.: 12/524,831

(22) PCT Filed: Jan. 9, 2008

(86) PCT No.: PCT/JP2008/050147
§ 371 (c)(1),
(2), (4) Date: Aug. 31, 2009

(87) PCT Pub. No.: WO2008/093518
PCT Pub. Date: Aug. 7, 2008

(65) Prior Publication Data
US 2010/0086068 A1   Apr. 8, 2010

(30) Foreign Application Priority Data
Jan. 30, 2007 (JP) ................................ 2007-019714

(51) Int. Cl.
*H04L 27/28* (2006.01)

(52) U.S. Cl. ........ 375/260; 375/295; 375/316; 375/279; 375/285; 375/308; 375/302

(58) Field of Classification Search .................. 375/295, 375/316, 260, 279, 285, 302, 308
See application file for complete search history.

(56) References Cited

U.S. PATENT DOCUMENTS

| | | | | |
|---|---|---|---|---|
| 6,631,167 | B1 | 10/2003 | Cambonie et al. | 375/260 |
| 7,248,898 | B2 | 7/2007 | Doi et al. | 455/562.1 |
| 2006/0014497 | A1 | 1/2006 | Doi et al. | 455/67.11 |
| 2007/0002725 | A1 | 1/2007 | Nystrom et al. | 370/208 |
| 2007/0135173 | A1 | 6/2007 | Doi et al. | 455/562.1 |
| 2008/0080628 | A1* | 4/2008 | To et al. | 375/260 |
| 2010/0111207 | A1* | 5/2010 | Suda et al. | 375/260 |
| 2011/0096861 | A1* | 4/2011 | Green | 375/295 |

FOREIGN PATENT DOCUMENTS

| | | |
|---|---|---|
| JP | 2001-024621 | 1/2001 |
| JP | 2001-333041 | 11/2001 |
| JP | 2003-283411 | 10/2003 |
| JP | 2004-153841 | 5/2004 |
| WO | WO 2005/060194 A1 | 6/2005 |
| WO | WO 2008/013027 A1 | 1/2008 |

OTHER PUBLICATIONS

PCT/IB2005/003845, Marilyn P. Green, by Nokia.*

* cited by examiner

*Primary Examiner* — Siu Lee
(74) *Attorney, Agent, or Firm* — DLA Piper LLP (US)

(57) ABSTRACT

A communication system using an OFDM includes a data creation section for coding data to be transmitted and mapping the data, a null symbol insertion section for filling a null symbol into a no-data subchannel if the number of subchannels containing the mapped data is small for the band assignment, and a symbol interleave section for performing symbol interleave in the whole user assignment band and inserting a known training symbol and pilot symbol into the determined symbol position of the user assignment band are included and symbols are placed such that signal phase change is continuous in the same subcarrier between symbols and carrier sense is executed at the positions of the symbols where the signal phase change is continuous.

9 Claims, 13 Drawing Sheets

USER DATA

USER DATA — NULL SYMBOLS

TIME / FREQUENCY / TDMA SLOT

| | READ → | | | | | |
|---|---|---|---|---|---|---|
| 1 | M+1 | 2M+1 | ... | ... | (N-2)M+1 | (N-1)M+1 |
| 2 | M+2 | 2M+2 | ... | ... | (N-2)M+2 | (N-1)M+2 |
| 3 | M+3 | 2M+3 | ... | ... | (N-2)M+3 | (N-1)M+3 |
| ... | ... | ... | ... | ... | ... | ... |
| ... | ... | ... | ... | ... | ... | ... |
| M | 2M | 3M | ... | ... | (N-1)M | NM |

(WRITE ↓)

CONVENTIONAL OFDM SYMBOL WHEN NUMBER OF WAVES IS THREE

COMMUNICATION SYSTEM, BASE STATION, TERMINAL, AND COMMUNICATION METHOD

CROSS-REFERENCE TO THE RELATED APPLICATIONS

This application is a national stage of international application No. PCT/JP2008/050147 filed on Jan. 9, 2008, which also claims the benefit of priority under 35 USC §119 to Japanese Patent Application No. 2007-019714 filed on Jan. 30, 2007, the entire contents of which are incorporated herein by reference.

TECHNICAL FIELD

The present invention relates to a communication system, a base station, a terminal, and a communication method.

BACKGROUND ART

A TDMA/TDD system provided by combining TDMA (Time Division Multiple Access) and TDD (Time Division Duplex) is adopted as a wireless access system of a digital mobile telephone system, a PHS system, etc. Further, in addition to the TDMA/TDD system, an OFDMA (Orthogonal Frequency Division Multiplexing Access) system making the most of OFDM (Orthogonal Frequency Division Multiplexing) is proposed.

The OFDMA system is a system of dividing a carrier wave for modulating data into "subcarriers" (subdivided carrier waves) orthogonal to each other, distributing a data signal into the subcarriers, collecting subcarriers from among the subcarriers into a group, assigning one or more groups to each user, and conducting multiplex communication. Each of the groups is called a subchannel. This means that each user conducts communications using one or more assigned subchannels. The number of subchannels is increased or decreased adaptively for assignment in response to the data amount, the propagation environment, etc., for conducting communications.

An adaptive array technology using an adaptive array exists to perform transmission and reception having directivity at the transmitting time of a down signal from a base station to a terminal and at the receiving time of an up signal from a terminal by a base station to suppress the effect of communications in a different base station and maintain good communication quality.

Signal processing with an adaptive array extracts precisely a signal from any desired terminal by calculating a weight vector (reception weight vector) made of a reception coefficient (weight) for each antenna of a base station based on a reception signal from a terminal and performing adaptive control, namely, multiplying the reception signals of a plurality of antennas by each element of the reception weight vector.

As the processing is performed, the up signal from the antenna of each terminal is received by an adaptive array antenna of the base station and is separated and extracted with reception directivity.

Further, a signal provided by multiplying a transmission signal by each element of a transmission weight vector calculated based on the reception weight vector is output from each of antennas, whereby a down signal from the base station to the terminal is transmitted with transmission directivity for the antenna of the terminal (refer to patent literature 1).

Patent Literature 1: JP-A-2003-283411 (paragraphs [0005] and [0006])

DISCLOSURE OF THE INVENTION

Problems to be Solved by the Invention

To generate a down weight based on the reception weight calculated according to an up signal using the conventional adaptive array technology in the OFDM communication system, if no up signal exists, it is also necessary to transmit data as idle burst and calculate a reception weight. In this case, there is a possibility that in the up signal, the amplitude component of an OFDM signal will increase and momentary peak power will become high, and there is a problem in that the symbol quality of the time combining the OFDM signal at the time is degraded. Thus, it is very difficult to design hardware.

When carrier sense is executed, if a discontinuous part of a signal waveform exists in the measurement area because of the effect of a signal delayed in a timing, interference power measured in carrier sense measurement becomes smaller than the actually received power and normal measurement cannot be conducted; this is a problem.

The invention is embodied for solving the problems described above and it is an object of the invention to provide a communication system that can reduce the probability that peak power will momentarily rise and ease degradation of the signal quality and further can measure normal interference power in carrier sense measurement in the OFDM system communication system using an adaptive array, a base station, and a communication method.

Means For Solving the Problems

In order to solve the problems, according to a communication system of the invention, there is provided a communication system using an OFDM system, comprising: a transmission processing section for placing symbols such that signal phase change is continuous in the same subcarrier between symbols; and a reception processing section for executing carrier sense at positions of the symbols where the signal phase change is continuous.

According to the configuration described above, in the OFDM system communication system, the probability that peak power will momentarily rise can be reduced and degradation of the signal quality can be eased and further normal interference power can be measured in carrier sense measurement.

Further, according to the communication system of the invention, wherein, in the transmission processing section, the symbols placed such that the signal phase change is continuous are two symbols, and one symbol is inverted and placed such that the two symbols become line symmetry with respect to a time axis.

According to the configuration described above, one symbol is inverted and placed such that the two symbols become line symmetry with respect to the time axis, so that placement such that the signal phase change is continuous can be easily realized.

Further, according to the communication system of the invention, wherein, in the transmission processing section, the symbols placed such that the signal phase change is continuous are continuous symbols, and in the symbols following the top of the symbols, phase change is given for each of the subcarriers such that the phase change is continuous for each subcarrier for the symbol preceding each symbol.

According to the configuration described above, phase change is given for each of the subcarriers such that the phase change is continuous for each subcarrier for the symbol preceding each symbol, so that a discontinuous point disappears in the symbol joint part and it is made possible to realize the reception power value of a valid interference wave in carrier sense.

Further, according to the communication system of the invention, wherein the transmission processing section further comprises: data creation means for coding data to be transmitted and mapping the data; null symbol insertion means for filling a null symbol into a no-data subchannel if the number of subchannels containing the mapped data is small for the band assignment; and symbol interleave means for performing symbol interleave in the whole user assignment band and inserting a known training symbol and pilot symbol into the determined symbol position of the user assignment band.

According to the configuration described above, the data portion other than training symbols required for weight computation and synchronization of the adaptive array is filled with null symbols and symbol interleave is performed in the whole user symbols, whereby the number of waves of the OFDM composite signal can be decreased, so that the probability that peak power will momentarily rise can be reduced and degradation of the signal quality can be eased.

Further, signal phase change is continuous in the same subcarrier between symbols and accordingly a continuous wave is formed, so that a discontinuous point also disappears still after FFT for the signal delayed in the timing and interference power can be normally measured in carrier sense measurement.

As for a base station according to the invention, there is provided a base station using an OFDM system, comprising: a transmission processing section for placing symbols such that signal phase change is continuous in the same subcarrier between symbols.

According to the configuration described above, the probability that peak power will momentarily rise can be reduced and degradation of the signal quality can be eased and further normal interference power can be measured in carrier sense measurement.

According to the base station of the invention, wherein, in the transmission processing section, the symbols placed such that the signal phase change is continuous are two symbols, and one symbol is inverted and placed such that the two symbols become line symmetry with respect to a time axis.

According to the configuration described above, According to the configuration described above, one symbol is inverted and placed such that the two symbols become line symmetry with respect to the time axis, so that placement such that the signal phase change is continuous can be easily realized.

According to the base station of the invention, wherein, in the transmission processing section, the symbols placed such that the signal phase change is continuous are continuous symbols, and in the symbols following the top of the symbols, phase change is given for each of the subcarriers such that the phase change is continuous for each subcarrier for the symbol preceding each symbol.

According to the configuration described above, phase change is given for each of the subcarriers such that the phase change is continuous for each subcarrier for the symbol preceding each symbol, so that a discontinuous point disappears in the symbol joint part and it is made possible to realize the reception power value of a valid interference wave in carrier sense.

As for a terminal according to the invention, there is provided a terminal for conducting OFDM system communications, comprising: a signal processing section for processing a received signal and a signal to be transmitted, wherein the signal processing section receives a signal with symbols placed such that signal phase change is continuous in the same subcarrier between symbols and executes carrier sense at positions of the symbols where the signal phase change is continuous.

According to the configuration described above, it is made possible to realize the reception power value of a valid interference wave in carrier sense.

As for a communication method of the invention, there is provided an OFDM system communication method comprising the steps of: placing symbols such that signal phase change is continuous in the same subcarrier between symbols; and executing carrier sense at positions of the symbols where the signal phase change is continuous.

According to the method described above, the probability that peak power will momentarily rise can be reduced and degradation of the signal quality can be eased and normal interference power can be measured in carrier sense measurement.

Advantages of the Invention

According to the invention, there can be provided a communication system that can reduce the probability that peak power will momentarily rise and ease degradation of the signal quality and further can measure normal interference power in carrier sense measurement in the OFDM system communication system, a base station, and a communication method.

Figure 1:
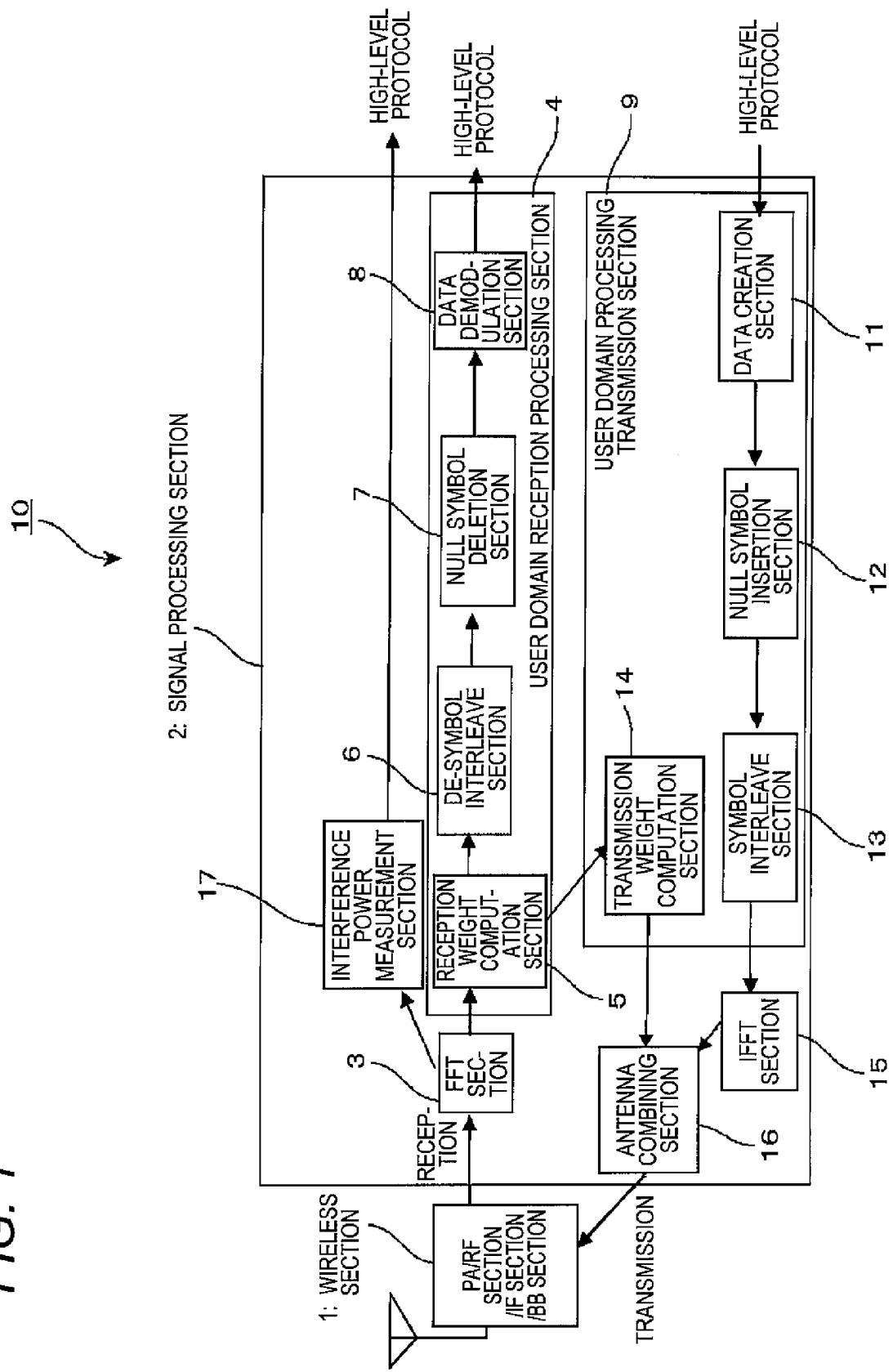
FIG. 1 is a functional block diagram of a base station according to an embodiment of the invention.

DESCRIPTION OF REFERENCE NUMERALS 1, 21 Wireless section (PA/RF section/IF section/BB section)
2, 22 Signal processing section
3, 23 FFT section,
4 Receiving user domain processing section
5 Reception weight computation section
6, 24 De-symbol interleave section
7, 25 Null symbol deletion section
8, 26 Data demodulation section
9 Transmitting user domain processing section
10 Base station
11, 27 Data creation section (data creation means)
12, 28 Null symbol insertion section (null symbol insertion means)
13, 29 Symbol interleave section (means for performing symbol interleave)
14 Transmission weight computation section
15, 30 IFFT section
16 Antenna combining section
17 Interference power measurement section
20 Terminal
31 Communication quality measurement section

BEST MODE FOR CARRYING OUT THE INVENTION

An embodiment of a communication system according to the invention will be discussed in detail with reference to the accompanying drawings.

Figure 2:
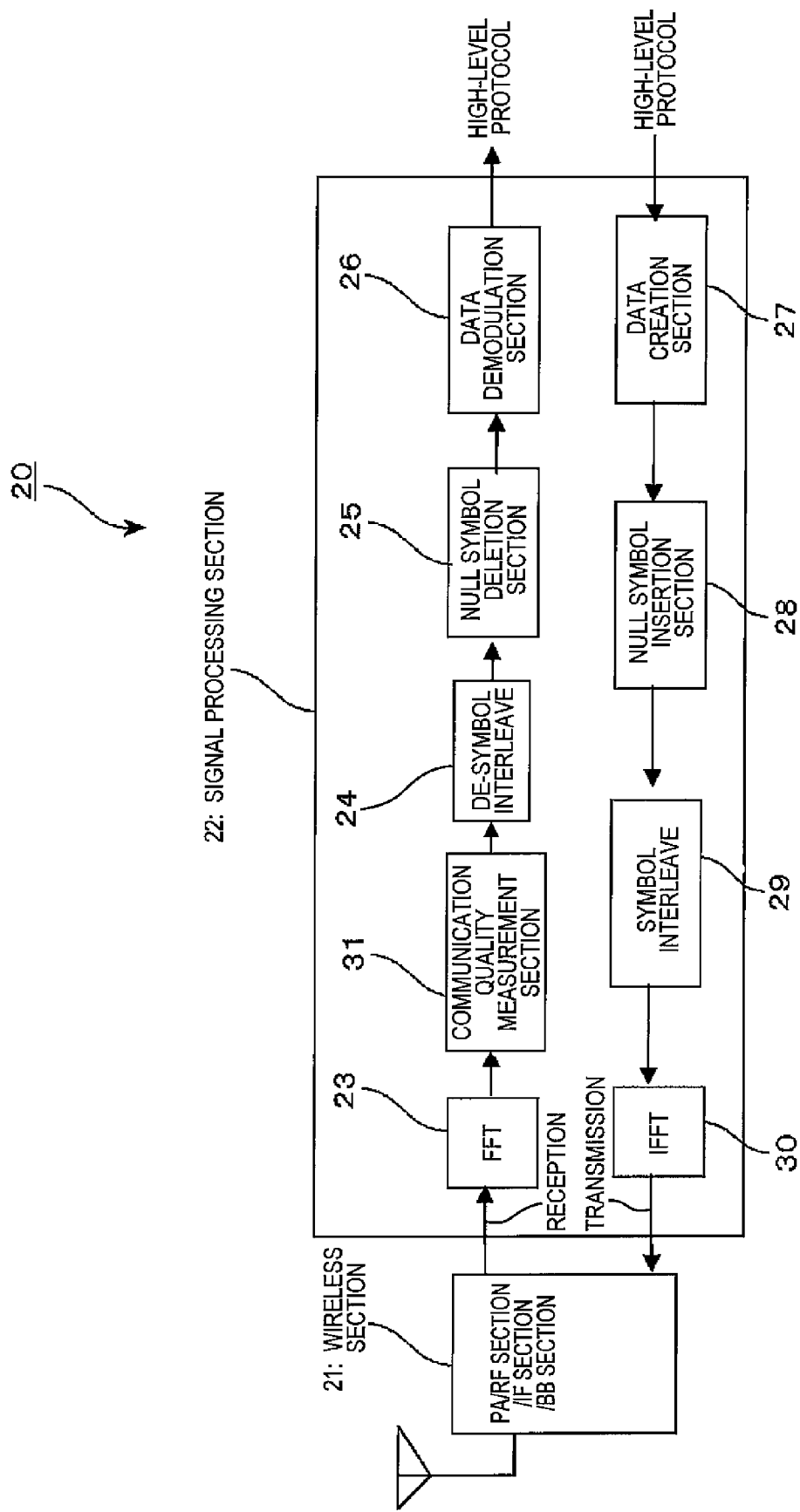
FIG. 2 is a functional block diagram of a terminal according to the embodiment of the invention.

FIG. 1 is a functional block diagram of a base station according to the embodiment of the invention, and FIG. 2 is a functional block diagram of a terminal.

To begin with, the functional configuration of the base station according to the embodiment of the invention will be discussed.

A base station 10 of the embodiment is made up of a wireless section (PA/RF section/IF section/BB section) 1 and a signal processing section 2 for processing a received signal.

The signal processing section 2 includes an FFT section 3, a user domain reception processing section 4, a user domain transmission processing section 9, an IFFT section 15, and an antenna combining section 16.

The user domain reception processing section 4 includes a reception weight computation section 5, a de-symbol interleave section 6, a null symbol deletion section 7, a data demodulation section 8, and an interference power measurement section 17.

The transmitting user domain processing section 9 includes a data creation section 11, a null symbol insertion section 12, a symbol interleave section 13, and a transmission weight computation section 14.

Next, the functional configuration of the terminal according to the embodiment of the invention will be discussed.

A terminal 20 of the embodiment is made up of a wireless section (PA/RF section/IF section/BB section) 21 and a signal processing section 22 for processing a received signal.

The signal processing section 22 includes an FFT section 23, a communication quality measurement section 31, a de-symbol interleave section 24, a null symbol deletion section 25, a data demodulation section 26, a data creation section 27, a null symbol insertion section 28, a symbol interleave section 29, and an IFFT section 30.

Next, a communication method of the base station 10 in the communication system according to the embodiment will be discussed.

Figure 3:
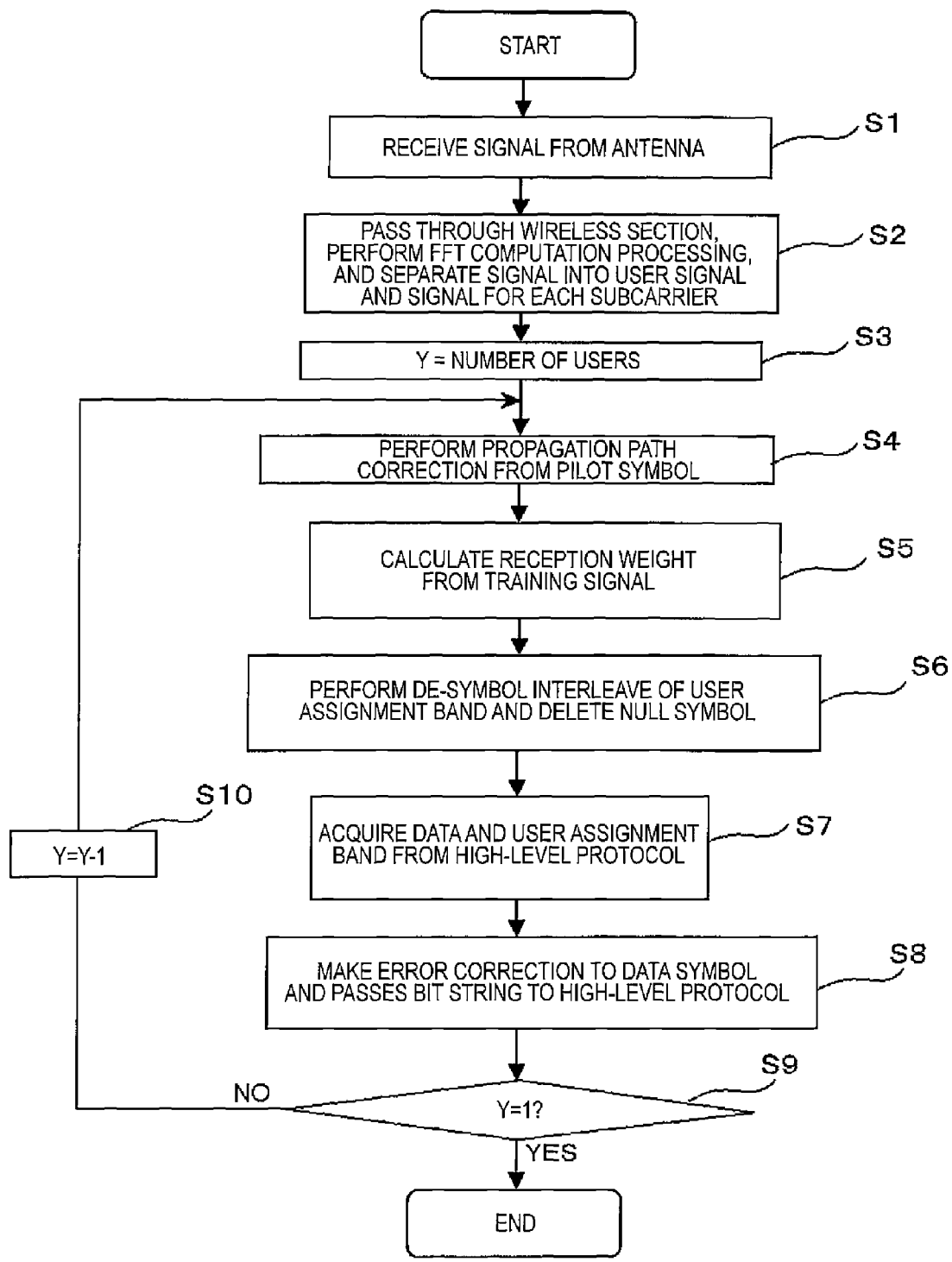
FIG. 3 is a flowchart to describe reception processing of the base station according to the embodiment of the invention.

To begin with, reception processing will be discussed with reference to FIG. 3. FIG. 3 is a flowchart to describe reception processing of the base station of the embodiment.

The reception processing of the base station 10 of the embodiment receives a signal from an antenna (step S1), passes through the wireless section 1, performs FFT computation processing in the FFT section 3, and separates the signal into a user signal and a signal for each carrier (step S2).

Each provided user signal is sent to the receiving user domain processing section 4 for performing processing for each user. The number of user signals is assigned to a variable Y (Y=number of users: Step S3) and as processing for each subchannel for the user signal, the reception weight computation section 5 performs a propagation path correction from a pilot symbol (step S4) and calculates reception weight from a training signal (step S5).

Next, the de-symbol interleave section 6 performs de-symbol interleave of a user assignment band and the null symbol deletion section 7 deletes a null symbol to extract a data symbol (step S6).

Data and a user assignment band are acquired from a high-level protocol (step S7).

The data demodulation section 8 demodulates the data symbol, makes an error correction to the data symbol, takes out a bit string, and passes the bit string to the high-level protocol (step S8). Whether or not the value of the variable Y is 1 is determined (step S9) and if Y is not equal to 1 (NO at step S9), Y is decremented by one (step S10) and processing of the next user is performed at step S4. If Y is equal to 1 (YES at step S9), processing for all user signals is complete and thus the processing is terminated.

Figure 4:
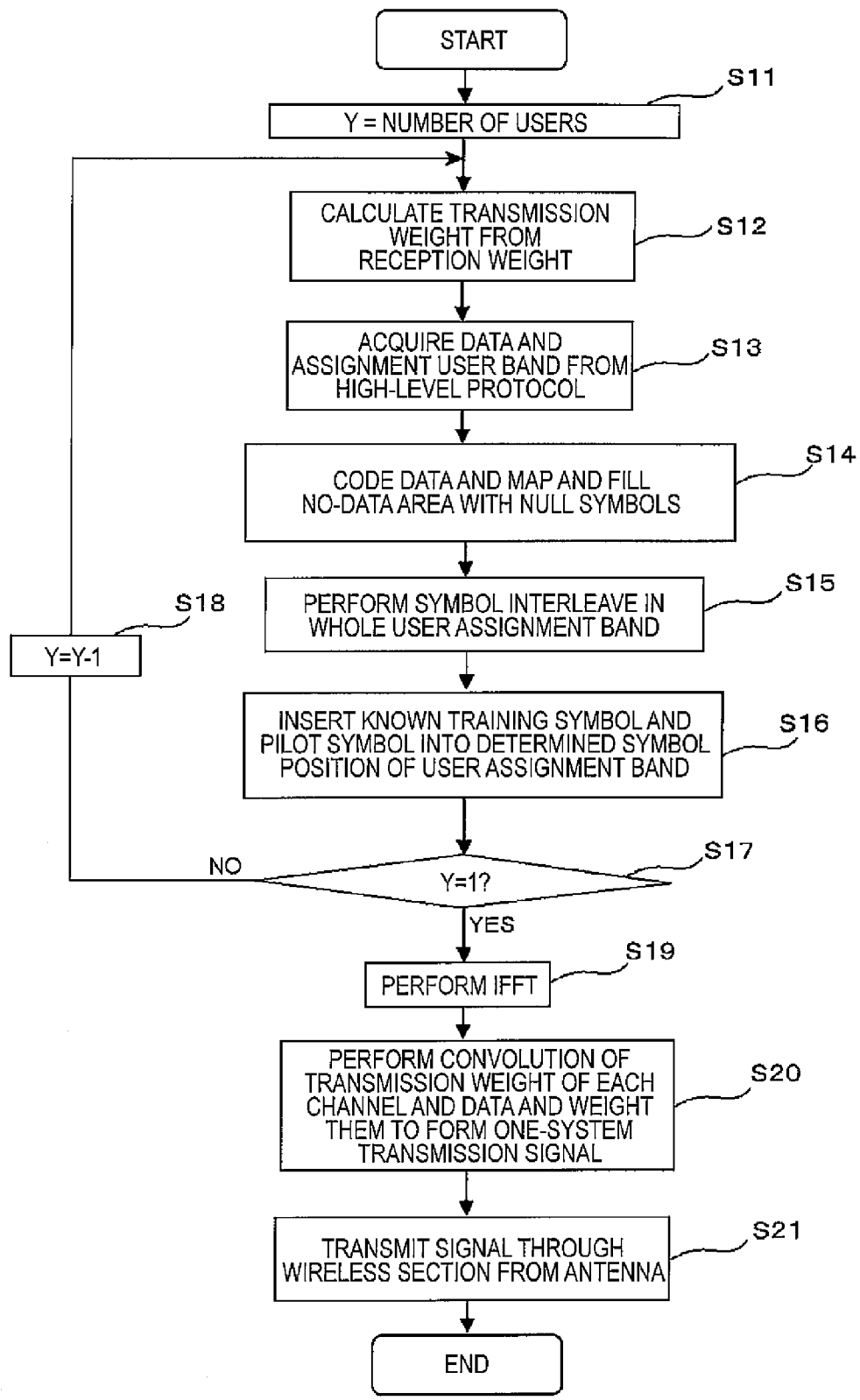
FIG. 4 is a flowchart to describe transmission processing of the base station according to the embodiment of the invention.

Next, transmission processing will be discussed with reference to FIG. 4. FIG. 4 is a flowchart to describe transmission processing of the base station of the embodiment.

The transmission processing of the base station 10 of the embodiment first assigns the number of user signals to the variable Y (Y=number of users: Step S11) and calculates the transmission weight for each subchannel from the reception weight in the transmission weight computation section 14 of the transmitting user domain processing section 9 for performing processing for each user (step S12).

The transmitting user domain processing section 9 acquires data in a communication network and a user assignment subchannel (user assignment band) in a predetermined format from the high-level protocol (step S13). The subchannel is the minimum symbol block for conducting data communications of the user.

Next, the data creation section 11 codes the data and maps the user assignment subchannel. The null symbol insertion section 12 fills a no-data area with null symbols if the number of data pieces is small for the assigned subchannel (step S14).

Then, the symbol interleave section 13 performs symbol interleave in the whole user assignment band (step S15) and inserts a known training symbol and pilot symbol into the symbol position for performing carrier sense of the user assignment band (step S16).

The symbol interleave section 13 may perform symbol interleave in the whole user assignment band after inserting a known training symbol and pilot symbol into a predetermined symbol position of the user assignment band.

At this time, to form a continuous wave at the position at the timing of executing carrier sense, the pilot symbol is inserted such that one pilot symbol is inverted and placed so that two pilot symbols become line symmetry with respect to a time axis (see FIG. 10 described later).

Alternatively, to insert the pilot symbol, to form a continuous wave at the position at the timing of executing carrier sense, the phase of the following symbol is offset so that the amplitude of the OFDM signal after a predetermined symbol continuously changes (see FIGS. 14 and 15 described later).

Figure 14:
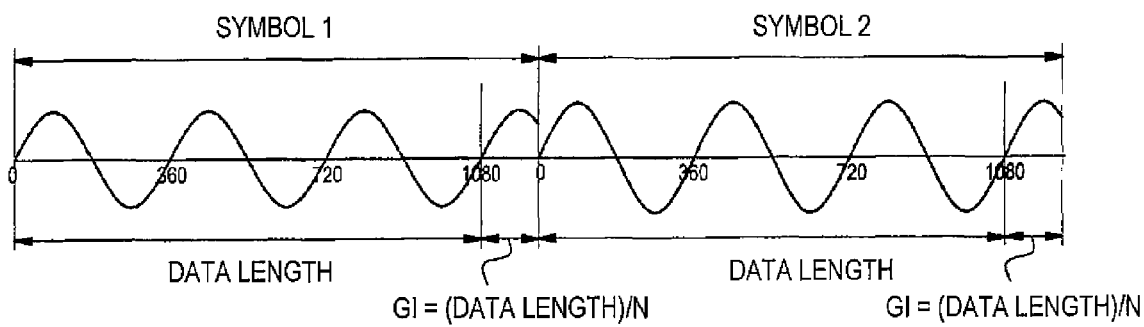
FIG. 14 is a waveform chart to show time direction symbols of subcarriers for conventional OFDM symbol when the number of waves is three (discontinuous signal exists).
Figure 15:
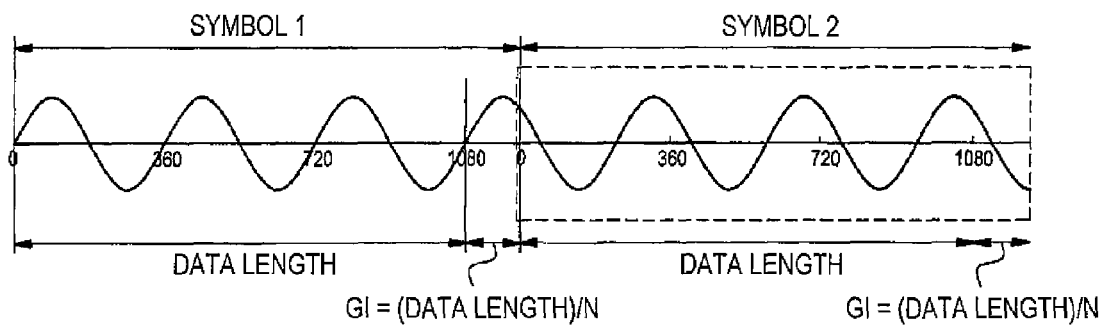
FIG. 15 is a waveform chart to show time direction symbols of subcarriers for OFDM symbol of the invention when the number of waves is three (no discontinuous signal exists).

When the guard interval (hereinafter, GI) length of OFDM symbol is data length/N (where N is an integer) so that two symbols are continuous, if the first symbol is represented by expression 1, the phase of the second symbol is offset as in expression 2, whereby a discontinuous point occurs in the symbol joint part as shown in FIG. 14 in the conventional system; in the invention, however, a discontinuous point disappears in the joint part as shown in FIG. 15 and it is made possible to realize the reception power value of a valid interference wave in carrier sense.

Here, n is the number of waves, units of θ are radians, and A is an amplitude.

$$A \times \exp(j(\theta)) \qquad \text{(Expression 1)}$$

$$A \times \exp(j(\theta + 2\pi \times n/N)) \qquad \text{(Expression 2)}$$

Whether or not the value of the variable Y is 1 is determined (step S17 and if Y is not equal to 1 (NO at step S17), Y is decremented by one (step S18) and processing of the next user is performed at step S12.

If Y is equal to 1 (YES at step S17), the transmitting user domain processing section 9 creates data for each user and the IFFT section 15 performs IFFT computation processing (step S19).

The antenna combining section 16 performs convolution of the transmission weight of each channel and data and weights them to form a one-system transmission signal.

The transmission signal is transmitted through the wireless section 1 from the antenna (step S21).

Next, a communication method of the terminal 20 in the communication system according to the embodiment will be discussed.

Figure 5:
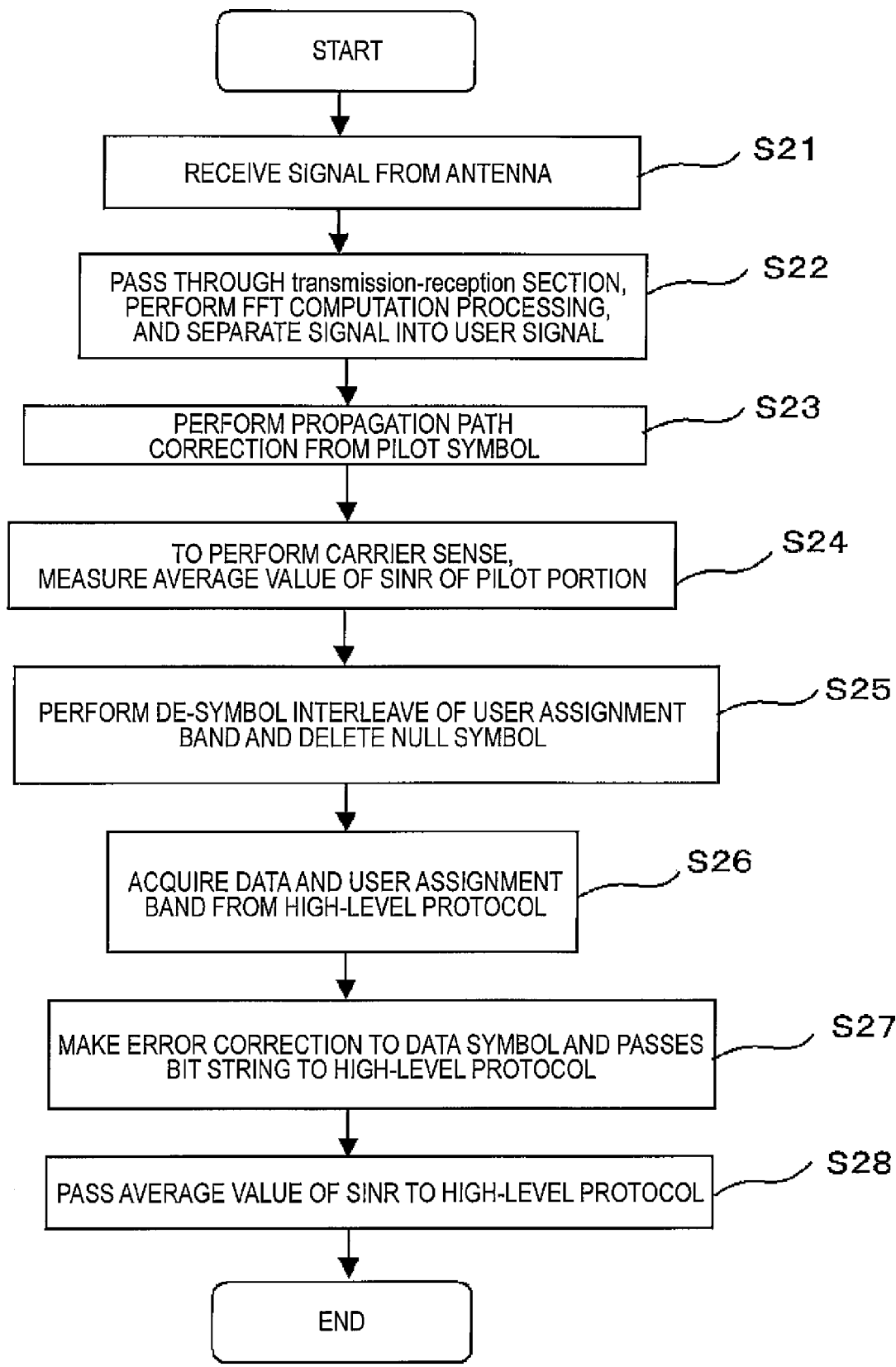
FIG. 5 is a flowchart to describe reception processing of the terminal according to the embodiment of the invention.

To begin with, reception processing will be discussed with reference to FIG. 5. FIG. 5 is a flowchart to describe reception processing of the terminal of the embodiment.

The reception processing of the terminal 20 of the embodiment receives a signal from an antenna (step S22), passes through the wireless section 21, performs FFT computation processing in the FFT section 23, and separates the signal into signals each for each subcarrier (step S23).

The signal processing section 22 performs a propagation path correction from the pilot symbol of the signal for each subcarrier sent from the FFT section 23 (step S24).

To perform carrier sense of the terminal 20, the communication quality measurement section 31 measures the average value of SINR of the pilot portion to measure SINR (Signal-to-Interference and Noise Ratio) indicating the wireless quality during communications (step S25).

Next, the de-symbol interleave section 24 performs de-symbol interleave of a user assignment band and the null symbol deletion section 25 deletes a null symbol (step S26) to extract a data symbol.

Data and a user assignment band are acquired from a high-level protocol (step S27).

The data demodulation section 26 demodulates the data symbol, makes an error correction to the data symbol, takes out a bit string, and passes the bit string to the high-level protocol (step S28).

The average value of the measured SIRN is also passed to the high-level protocol (step S29) and for a subchannel with the average value of the SIRN being equal to or less than a threshold value, a request for rejecting the assigned band is put on a transmission buffer.

Figure 6:
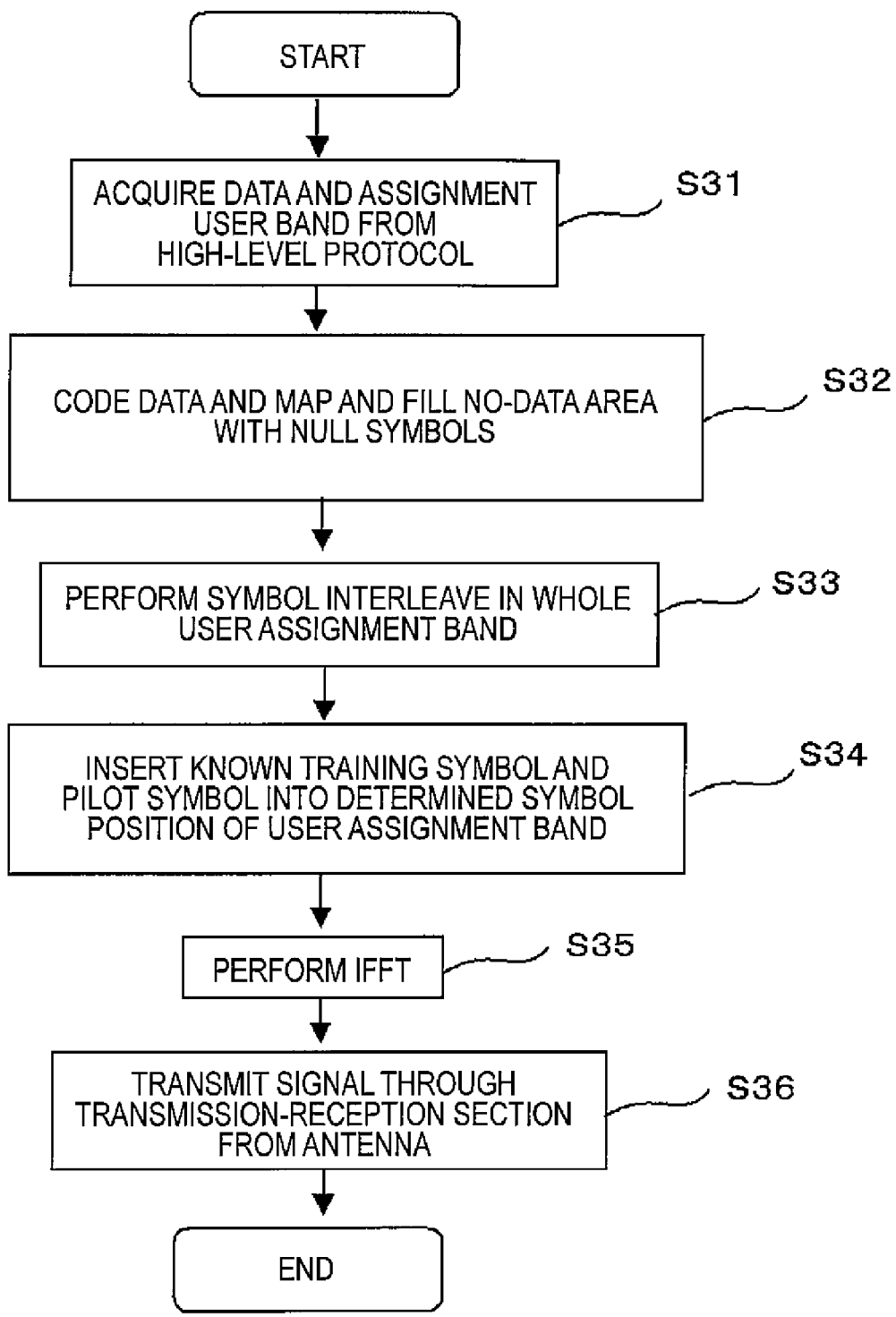
FIG. 6 is a flowchart to describe transmission processing of the terminal according to the embodiment of the invention.

Next, transmission processing will be discussed with reference to FIG. 6. FIG. 6 is a flowchart to describe transmission processing of the terminal of the embodiment.

The transmission processing of the terminal 20 of the embodiment acquires data in a communication network and a user assignment subchannel (user band) in a predetermined format from the high-level protocol (step S31). The subchannel is the minimum symbol block for conducting data communications of the user.

Next, the data creation section 27 codes the data and maps. The null symbol insertion section 28 fills a no-data area with null symbols if the number of subchannels of data is small for the band assignment (step S32).

Then, the symbol interleave section 29 performs symbol interleave in the whole user assignment band (step S33).

The symbol interleave section 29 may perform symbol interleave in the whole user assignment band after inserting a known training symbol and pilot symbol into a predetermined symbol position of the user assignment band.

A known training symbol and pilot symbol are inserted into the determined symbol position of the user assignment band (step S34).

At this time, to form a continuous wave at the position of executing carrier sense, the pilot symbol is inserted so that one pilot symbol is inverted and placed so that two pilot symbols become line symmetry with respect to a time axis (see FIG. 10 described later).

The IFFT section 30 performs IFFT computation processing (step S35) and signal is transmitted through the wireless section 21 from the antenna (step S36).

Alternatively, to insert the pilot symbol, to form a continuous wave at the position at the timing of executing carrier sense, the phase of the following symbol is offset so that the amplitude of the OFDM signal after a predetermined symbol continuously changes (see FIGS. 14 and 15 described later).

When the GI length of OFDM symbol is data length/N (where N is an integer) so that two symbols are continuous, if the first symbol is represented by above-described expression 1, the phase of the second symbol is offset as in above-described expression 2, whereby a discontinuous point occurs in the symbol joint part as shown in FIG. 14 in the conventional system; in the invention, however, a discontinuous point disappears in the joint part as shown in FIG. 15 and it is made possible to realize the valid reception power value of an interference wave in carrier sense.

Next, carrier sense of the communication system according to the embodiment will be discussed.

Figure 7:
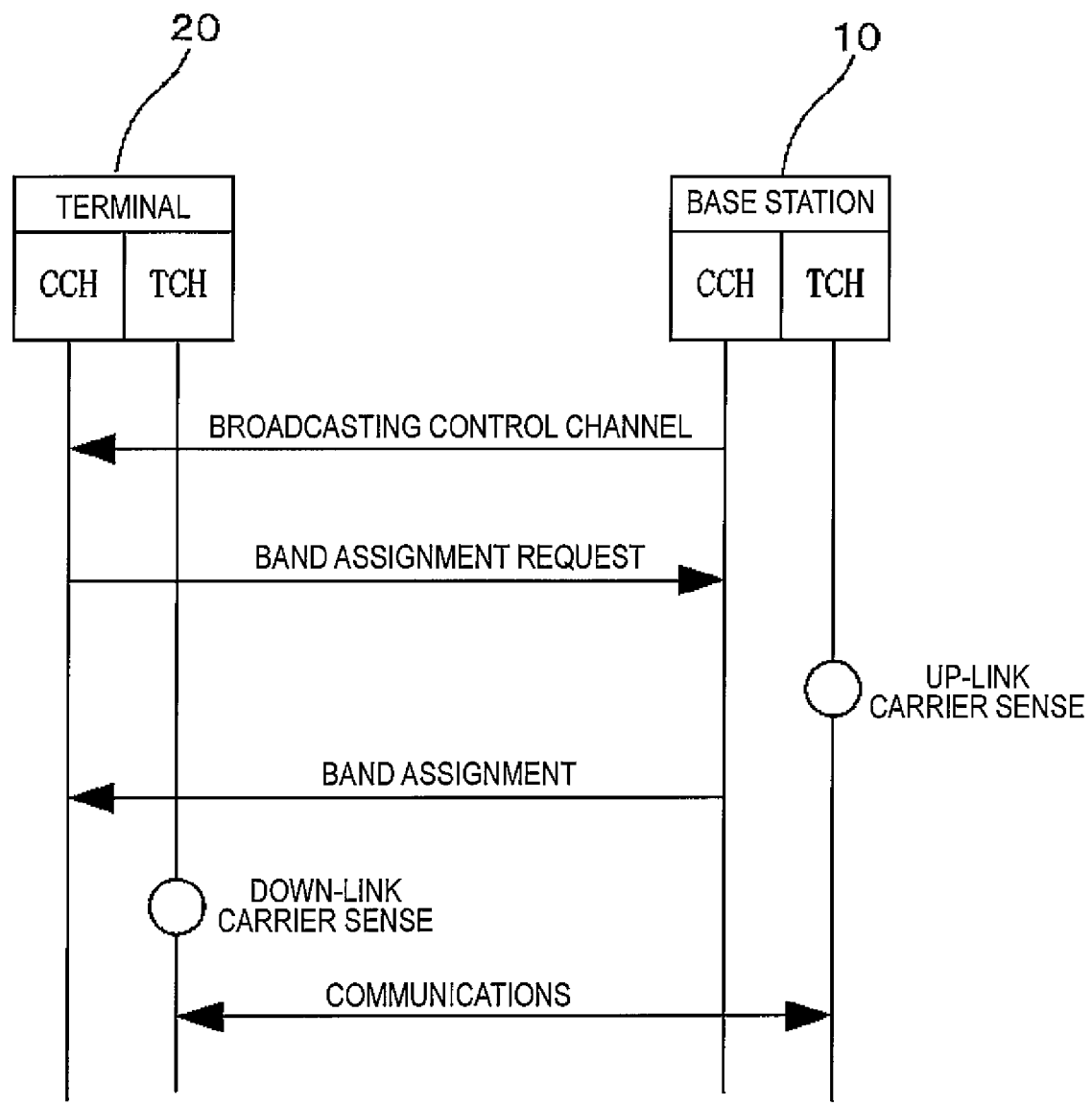
FIG. 7 shows a timing sequence example of carrier sense in a communication system according to the embodiment of the invention.
Figure 8A:
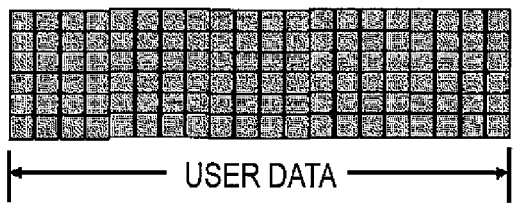
FIG. 8 is a drawing to describe an example of a method of inserting symbols into user assignment subchannels in the communication system according to the embodiment of the invention.
Figure 8B:
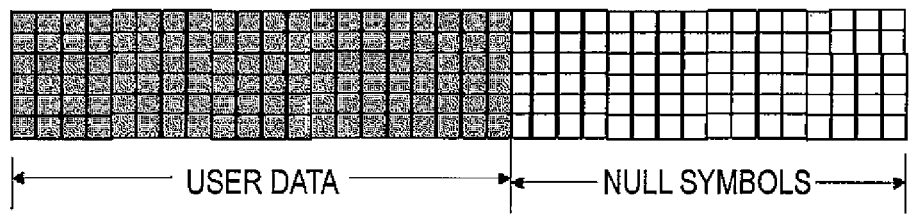
Figure 8C:
Figure 8D:
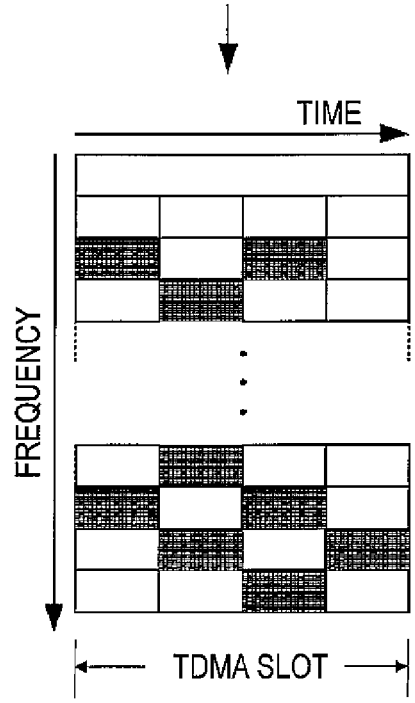

FIG. 7 shows a timing sequence example of carrier sense.

As shown in FIG. 7, the base station 10 continues to transmit a broadcasting control channel and when the terminal 20 wants to connect, it issues a band assignment request and the base station 10 performs up-link carrier sense and then executes band assignment.

When executing the carrier sense, the base station 10 measures interference power of a subcarrier not used in the base station 10 by the interference power measurement section 17. At the time, using pilot symbol with continuously concatenated symbols as shown in FIG. 6, power of one symbol in the concatenated portion is measured after FFT. There is a possibility of input at a shifted timing because of an interference wave; a power value is measured in one-symbol units from a predetermined timing to several symbols and the maximum power among the timings is adopted as interference power.

A plurality of symbols are averaged and the power value is passed to the high-level protocol. When the interference power is larger than a threshold value, the high-level protocol determines that the subchannel is used elsewhere, and does not make assignment to the subchannel.

When the band is assigned, the terminal 20 performs downlink carrier sense and checks the quality of the assigned subchannel and if the quality is poor, the terminal 20 rejects the subchannel for the base station 10.

After the assignment, communications are started between the base station 10 and the terminal 20.

An example of a demodulation method in the communication system according to the embodiment will be discussed with reference to FIG. 8.

User data as shown in FIG. 8 (*a*) is received from the high-level protocol and then is coded and is demodulated to provide data symbols.

Next, subchannels are filled with null symbols as much as the difference between the number of user assignment subchannels and the number of subchannels of data from the high-level protocol (see FIG. 8 (*b*)).

Next as shown in FIG. 8 (*c*), symbol interleave is performed. As shown in FIG. 8 (*d*), data after the symbol interleave is filled into subchannels of the band to which the user assignment subchannel is assigned.

To perform de-symbol interleave, de-symbol interleave of the user assignment band is performed, the null symbols are deleted, and the data symbols are extracted by reversing the order described above.

Next, carrier sense measurement of the communication system according to the embodiment will be discussed.

Figure 9:
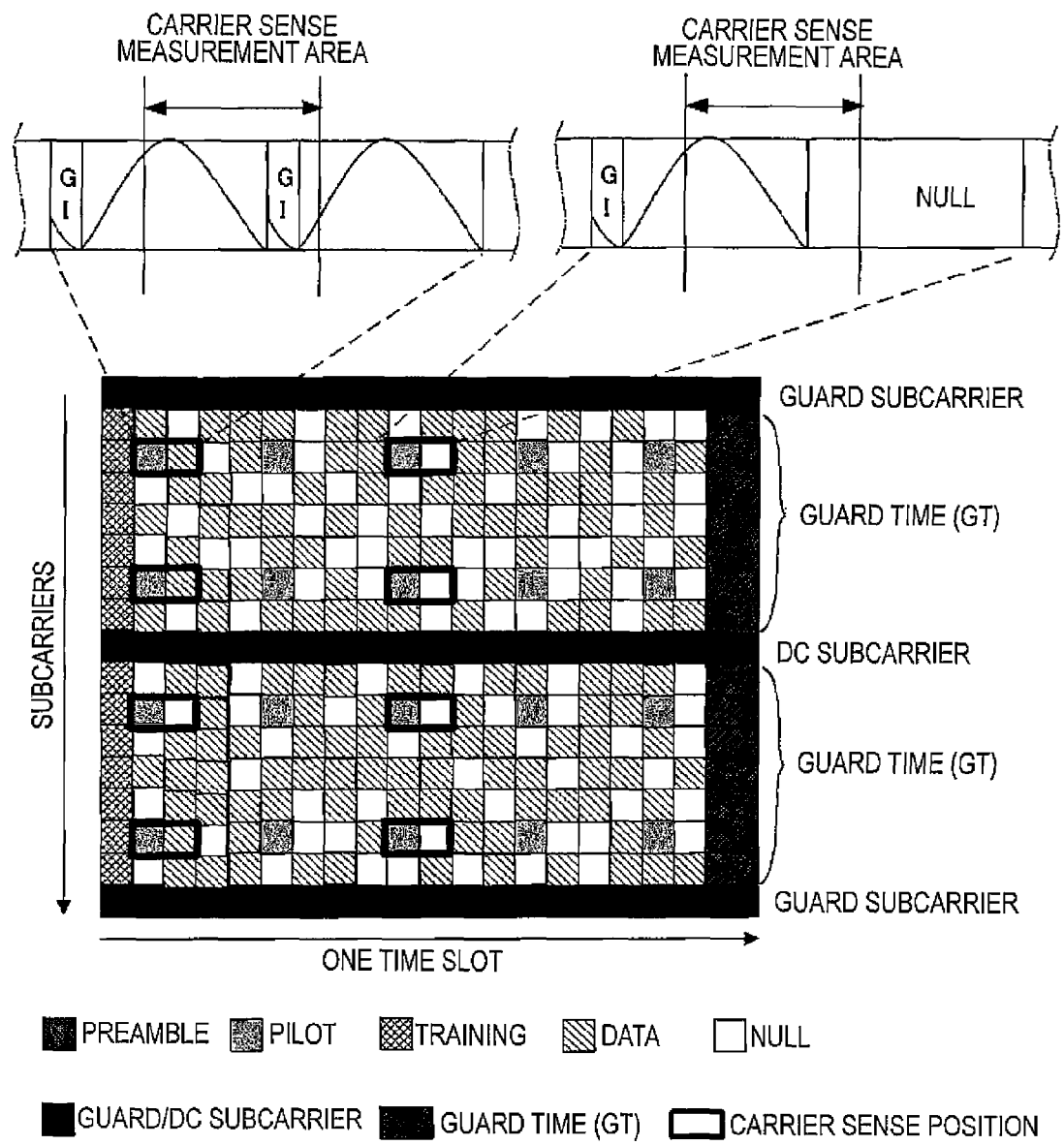
FIG. 9 is a symbol placement drawing to describe carrier sense measurement in a comparison example.
Figure 10:
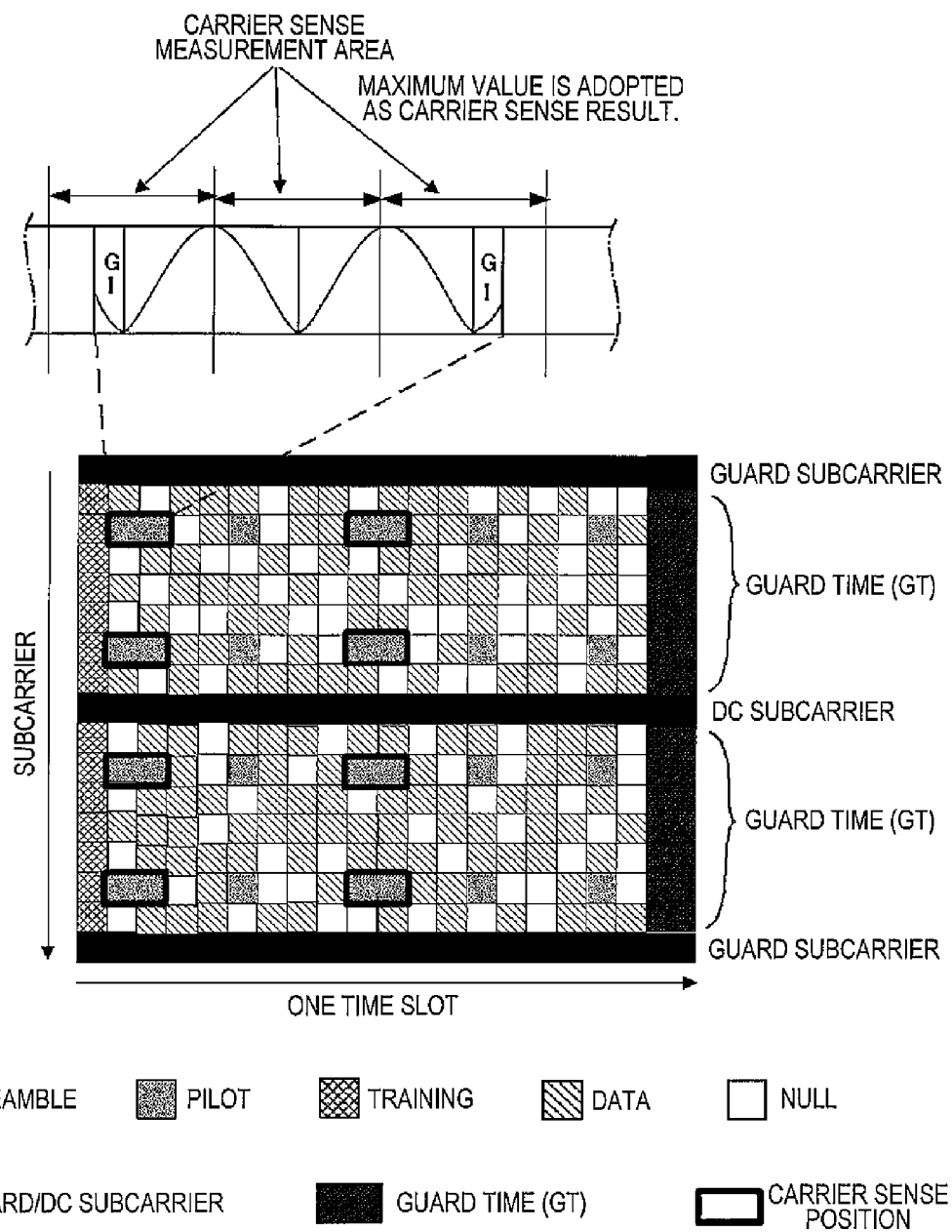
FIG. 10 is a symbol placement drawing to describe carrier sense measurement in one example of the communication system according to the embodiment of the invention.

FIG. 9 is a symbol placement drawing to describe carrier sense measurement in a comparison example, and FIG. 10 is a symbol placement drawing to describe carrier sense measurement in one example of the communication system according to the embodiment.

In the comparison example shown in FIG. 9, a discontinuous point occurs for a signal delayed in a timing at the carrier sense position and normal measurement cannot be conducted. If a null symbol is entered after a pilot symbol, data as much as one symbol is not inserted and thus normal measurement cannot be conducted.

In contrast, in the example of the carrier sense measurement of the communication system according to the embodiment, as shown in FIG. 10, one pilot symbol is inverted and placed so that two pilot symbols become line symmetry with respect to a time axis at the carrier sense position in the symbol placement format and accordingly a continuous wave is formed, so that a discontinuous point also disappears still after FFT for the signal delayed in the timing and interference power can be normally measured for one symbol.

A method of eliminating discontinuity of waveform by rotating the phase of the following symbol as shown in FIG. 15 for a conventional OFDM symbol string shown in FIG. 14 can also be used.

Since there is also an interference wave coming with a large delay from a predetermined timing, interference power of a slow-timing symbol is also measured and the maximum power among the timings is adopted as interference power.

As shown in FIG. 10, a plurality of carrier sense positions are set in the symbol placement format of one time slot so that measurement values at the positions can be averaged.

The symbol placement format of the communication system according to the embodiment can also be used in combination with any other pilot for the function of propagation path correction as the pilot.

Figures 11, 12:
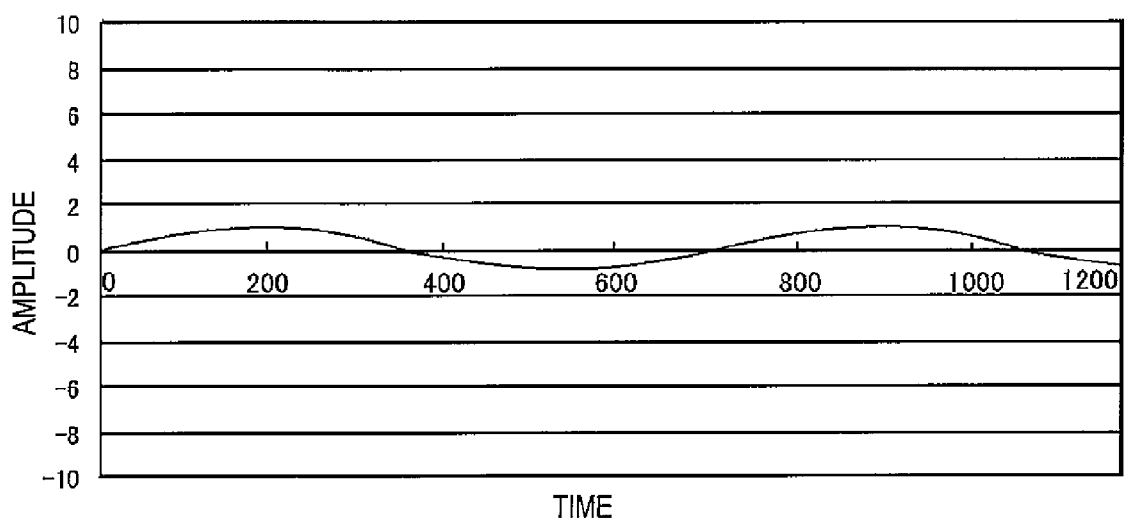
FIG. 11 is a drawing to describe an example of symbol interleave in the communication methods of the base station and the terminal 20 of the communication system according to the embodiment of the invention.
FIG. 12 is a waveform chart to show peak components caused by the difference in the number of OFDM waves (composite waveform of one wave).

FIG. 11 shows an example of symbol interleave in the communication methods of the base station 10 and the terminal 20 in the communication system according to the embodiment described above. The example shown in FIG. 11 is symbol interleave of a write manner in which read symbols are read in a lateral direction of predetermined block partitions and symbols are written in a longitudinal direction.

Figure 13:
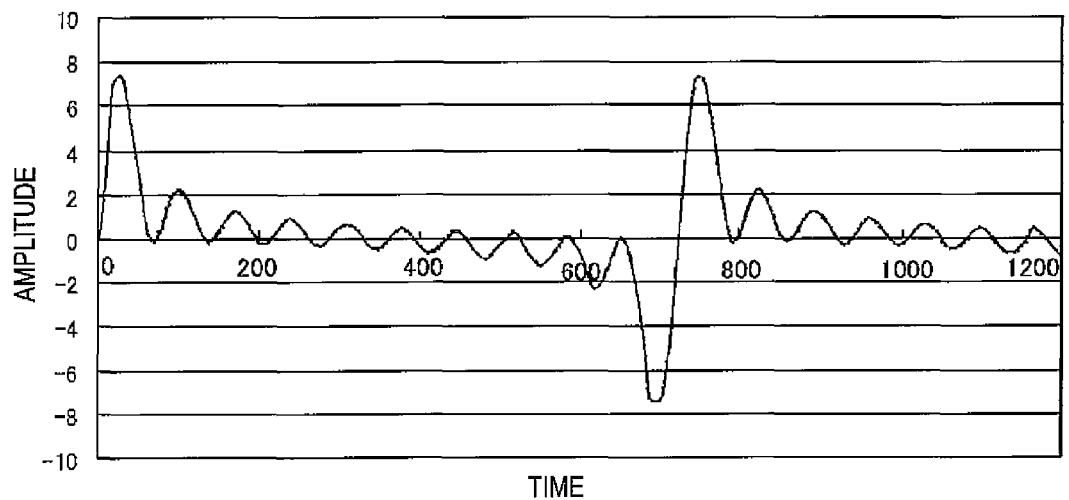
FIG. 13 is a waveform chart to show peak components caused by the difference in the number of OFDM waves (composite waveform of 10 waves).

FIGS. 12 and 13 are waveform charts to show peak components caused by the difference in the number of OFDM waves; FIG. 12 shows a composite waveform of one wave and FIG. 13 shows a composite waveform of 10 waves.

In the OFDM communication method, the greater the number of waves of OFDM composite signal, the larger the peak amplitude of the waveform of the composite signal, of course.

According to the communication system of the base station 10 and the terminal 20 in the communication system according to the embodiment, the data portion other than training symbols required for weight computation and synchronization of the adaptive array is filled with null symbols and symbol interleave is performed in the whole user symbols, whereby in the OFDM composite signal, for example, when the number of waves becomes 14 if null symbols are not entered, the number of waves can be decreased to about seven by entering null symbols, so that the probability that peak power will momentarily rise can be reduced and degradation of the signal quality can be eased.

Further, signal phase change is continuous in the same subcarrier between symbols and accordingly a continuous wave is formed, so that a discontinuous point also disappears still after FFT for the signal delayed in the timing and interference power can be normally measured in carrier sense measurement.

The invention claimed is:

1. A communication system using an OFDM system, comprising:
    a transmission processing section that places pilot and training symbols such that signal phase change is continuous in a same subcarrier between the placed pilot and training symbols; and
    a reception processing section that executes carrier sense measurement of reception power at positions of the placed pilot and training symbols where the signal phase change is continuous.

2. The communication system according to claim 1, wherein, in the transmission processing section, the symbols placed such that the signal phase change is continuous are two symbols, and one symbol is inverted and placed such that the two symbols become line symmetry with respect to a time axis.

3. The communication system according to claim 1, wherein, in the transmission processing section, the symbols placed such that the signal phase change is continuous are continuous symbols, and in symbols following the placed symbols, phase change is given for each subcarrier such that the phase change is continuous for each subcarrier for the placed symbol preceding each following symbol.

4. The communication system according to claim 1, wherein the transmission processing section further comprises:
   a data creation section that codes data to be transmitted and map the coded data;
   a null symbol insertion section that fills a null symbol into a no-data subchannel if the number of subchannels containing the mapped data is small for a band assignment; and
   a symbol interleave section that performs symbol interleave in a whole user assignment band and inserts the training symbol and the pilot symbol into a determined symbol position of the user assignment band.

5. A base station using an OFDM system, comprising:
   a transmission processing section that places symbols such that signal phase change is continuous in a same subcarrier between the placed symbols,
   wherein the transmission processing section further comprises a symbol interleave section that performs symbol interleave and inserts a training symbol and a pilot symbol into a position in which carrier sense measurement of reception power is performed.

6. The base station according to claim 5, wherein, in the transmission processing section, the symbols placed such that the signal phase change is continuous are two symbols, and one symbol is inverted and placed such that the two symbols become line symmetry with respect to a time axis.

7. The base station according to claim 5, wherein, in the transmission processing section, the symbols placed such that the signal phase change is continuous are continuous symbols, and in symbols following the placed symbols, phase change is given for each subcarrier such that the phase change is continuous for each subcarrier for the placed symbol preceding each following symbol.

8. A terminal for conducting OFDM system communications, comprising:
   a signal processing section that processes a received signal and a signal to be transmitted,
   wherein the signal processing section receives a signal with pilot and training symbols placed such that signal phase change is continuous in a same subcarrier between the placed pilot and training symbols and executes carrier sense measurement of reception power at positions of the placed pilot and training symbols where the signal phase change is continuous.

9. An OFDM system communication method comprising the steps of:
   placing pilot and training symbols such that signal phase change is continuous in a same subcarrier between the placed pilot and training symbols; and
   executing carrier sense measurement of reception power at positions of the placed pilot and training symbols where the signal phase change is continuous.

* * * * *